United States Patent [19]
Zushi

[11] Patent Number: 5,143,401
[45] Date of Patent: Sep. 1, 1992

[54] COVER FOR ACCOMMODATING AN AIR BAG

[75] Inventor: Takayasu Zushi, Shiga, Japan

[73] Assignee: Takata Corporation, Tokyo, Japan

[21] Appl. No.: 684,850

[22] Filed: Apr. 15, 1991

[30] Foreign Application Priority Data

May 24, 1990 [JP] Japan ................... 2-134682

[51] Int. Cl.$^5$ .............................................. B60R 21/20
[52] U.S. Cl. ...................................... 280/731; 280/743
[58] Field of Search ........................ 280/731, 732, 743

[56] References Cited

U.S. PATENT DOCUMENTS 3,794,349 2/1974 Fuller ................................... 280/732
4,184,503 4/1979 Shiratori .
5,056,814 10/1991 Shiraki ............................ 280/743 X

FOREIGN PATENT DOCUMENTS 184548 7/1988 Japan .
184549 7/1988 Japan .
1-202550 8/1989 Japan .

Primary Examiner—Richard A. Schacher
Attorney, Agent, or Firm—Kanesaka and Takeuchi

[57] ABSTRACT

A cover for accommodating an air bag, which has a core layer made from hard resin and a surface layer made from soft resin which are formed by a multicolor molding, and is provided at an inner surface with a groove for starting tear at a start of an operation of the air bag, the groove being provided at its bottom with spaced concave holes. In the cover, the holes are provided only in the core layer, and the hard resin layer is interposed between bottoms of the holes and the surface layer.

12 Claims, 4 Drawing Sheets

COVER FOR ACCOMMODATING AN AIR BAG

FIELD OF THE INVENTION AND RELATED ART STATEMENT

The present invention relates to a cover for accommodating an air bag which is adapted to be activated to inflate and develop by sensing an impact and/or deformation at a crash of a vehicle.

A prior art cover for accommodating an air bag is provided with a weak portion at which a cover starts to tear along an intended line when the air bag is activated. This weak portion is formed, for instance, of a continuous groove or intermittent grooves provided at the intended line (tear line) to be torn. There has been a cover of a two-layer structure which has a hard layer (core layer) and a soft layer (surface layer), and is provided with a slit along the tear line in the hard layer (core layer).

In the prior art cover for accommodating the air bag, the weak portion has a uniform weakness through its length. Therefore, the position in the weak portion at which the tear starts may vary depending on a manner which the air bag accommodated in the cover is folded. For example, the tear of the weak portion starts at a position near an end of the cover in some cases. Further, at an extremely low temperature, the cover may tear in an unexpected manner.

OBJECT AND SUMMARY OF THE INVENTION

It is an object of the invention to provide a cover for accommodating an air bag having a high quality, which is provided with a weak portion having a minimum strength at which tear surely starts and can be easily and efficiently fabricated with high molding accuracy by a multicolor molding without a defect due to surface contraction in a molding process.

A cover for accommodating an air bag according to the invention has a core layer made from hard resin and a surface layer made from soft resin which are formed by a multicolor molding, and is provided at an inner surface with a groove for starting tear at a start of an operation of the air bag, the groove being provided at its bottom with spaced concave holes. In the cover of the invention, the holes are provided only in the core layer, and the hard resin layer is interposed between the bottoms of the holes and the surface layer.

According to the cover for accommodating the air bag in the present invention, since the spaced holes are provided in the bottom of the groove to be torn, portions defining these holes have a minimum strength. Therefore, by closely disposing these holes at an intended position for starting the tear, the tear can be surely started at this position. That is, by virtue of closely disposing a large number of these holes in a middle portion of the cover, the middle portion of the cover has a minimum strength and thus the tear will start at the middle portion of the cover. Once the tear starts in the cover, the tear expands along the groove toward the ends, resulting in the good tear.

Generally, in a molding process of resin, surface contraction occurs due to its curing. Therefore, if the holes formed in the groove have bottoms at which the surface layer exposed, designed and intended configurations would not be fabricated by the molding. This will be described below with reference to FIGS. 5-7.

As shown in FIG. 5, if a groove 13 in a core layer 12 is provided with holes 14, of which bottoms are flush with a surface layer 11, a fabrication thereof in a bicolor molding causes, as shown in FIG. 6, a large surface contraction at surfaces 11b of the surface layer 11 corresponding to positions of the holes 14 due to surface contraction when curing after the injection molding of the surface layer. That is, in the surface 11a faced to the core layer 12 of the surface layer 11, surfaces 11c, which define the holes 14, form free ends which do not contact the core layer 12, so that these portions promote the surface contraction. Therefore, the resin of the surface layer 11 expands into the holes 14, and the surfaces 11b corresponding to these concave holes 14 form large caves due to the surface contraction. This caving may occur to such an extent that positions of the holes can be recognized only by viewing the external surface of the cover, which impairs an appearance of the cover.

Contrarily, according to the invention, as shown in FIG. 7, the holes 14 in the groove 13 are provided only in the core layer 12 and hard resin layers 15, i.e., continuous layers of the core layer 12 are interposed between the bottom 14a of the holes 14 and the surface layer 11. This prevents the cave which may be caused by the surface contraction in the injection molding of the surface layer 11.

DESCRIPTION OF THE PREFERRED EMBODIMENTS

Figure 1:
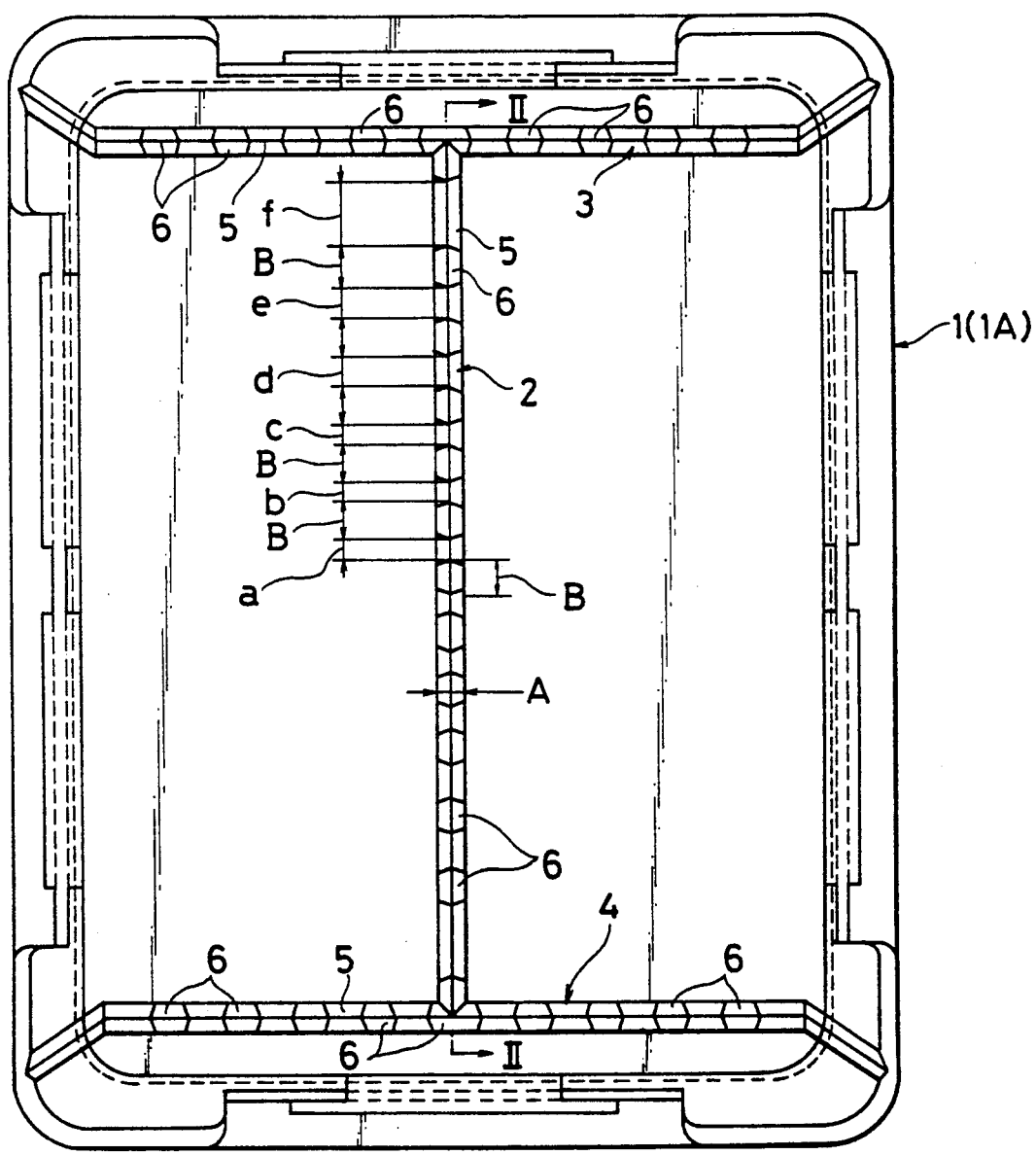
FIG. 1 is a bottom view of a cover according to an embodiment of the invention.

The invention will be further described with reference to the embodiments shown in the drawings.

A cover 1 is nearly oblong and has a core layer 1A made from hard resin and a surface layer 1B made from soft resin. The cover 1 is provided at its inner surface with a tear line formed as a central tear line 2 and end tear lines 3 and 4 for starting tear when an air bag is activated. The center tear line 2 extends through a central portion of the cover 1 in a lengthwise direction of the cover 1. The tear lines 3 and 4 extend in a widthwise direction of the cover 1 and are disposed near ends of the cover 1. The tear line 2 and the tear lines 3 and 4 are continuous to each other.

Figure 3:
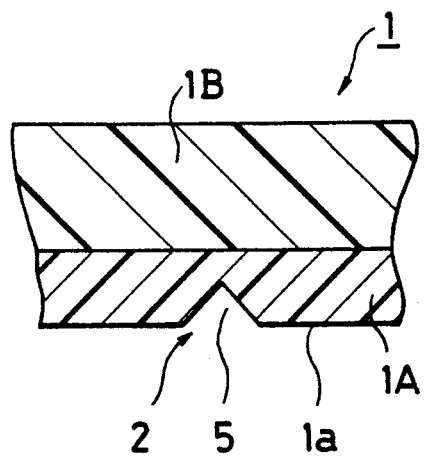
FIG. 3 is a cross section taken along line III—III in FIG. 2.
Figure 4A:
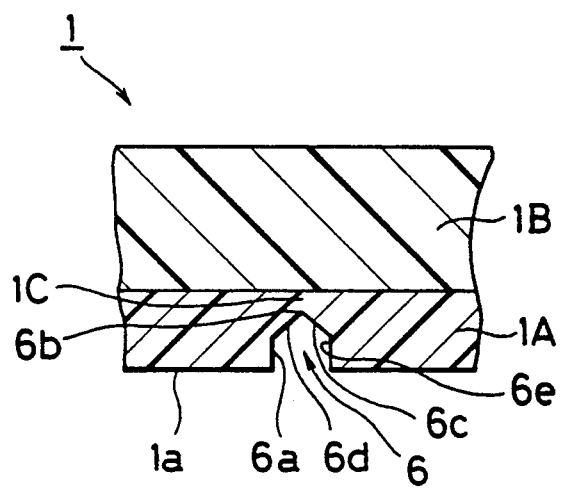
FIG. 4A is a cross section taken along line IV—IV in FIG. 2.
Figure 4B:
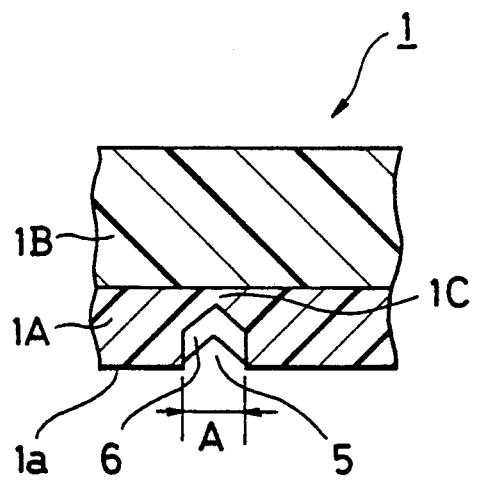
FIG. 4B is a cross section taken along the same line as in FIG. 4A.
Figure 5:
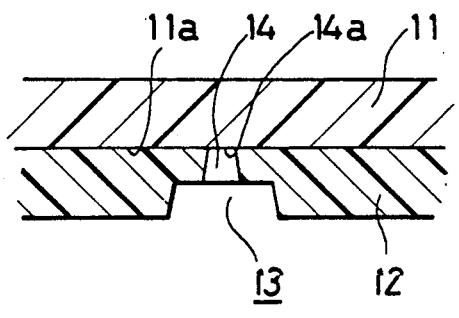
FIGS. 5 and 6 are cross sections for illustrating problems in a bicolor molding.
Figure 6:
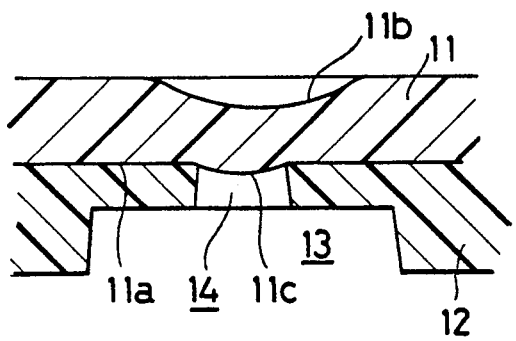

These tear lines 2, 3 and 4 include a continuous groove 5 and holes 6 which are formed in the groove 5 and are spaced from each other. As shown in FIG. 3, the groove 5 has a triangular section. As shown in FIG. 4, each hole 6 has side walls 6a and 6e perpendicular to a rear surface 1a of the cover 1 and inclined portions 6c and 6d which are formed at bottoms of these side walls 6 and 6e to form a triangular section with an apex 6b therebetween, and thus has a pentagonal section. Each hole 6a is formed only in the core layer 1A. The bottom (apex) 6b of each hole 6 and the bottoms (incline portions) 6c and 6d are spaced from the surface layer 1B with a hard resin layer 1C of the core layer 1A therebetween. Each hole 6 has a hexagonal shape in a bottom view of the cover 1, and this hexagon includes two opposed apexes which are aligned along a center line of the tear line 2, 3 or 4.

In a middle portion of the cover 1 (plate), the holes 6 are closely disposed in the center tear line 2 with reduced spaces therebetween. These spaces between the adjacent holes 6 increases, i.e., the density thereof decreases as the positions move toward the tear lines 3 and 4. In the illustrated embodiment, the distances a, b and c between the holes 6 shown in FIG. 1 are equal to each other, and distances d and e are also equal to each other. The distances a, b and c are determined to be minimum, and the distances d and e are larger than them, but are smaller than a maximum distance f.

In the tear lines 3 and 4, the distances between the adjacent holes 6 are substantially equal to each other. However, in a manner similar to the tear line 2, the distances between the adjacent holes 6 at the middle portions in the lengthwise direction of the tear lines 3 and 4 may be small and distances between the adjacent holes 6 may be increased as the positions move away from the middle portions.

For example, material of the cover 1 of the invention is preferably, but not restricted to, thermoplastic polymer of JIS-K7203 having a bending elastic modulus of 1000 kg/cm$^2$ or more. Specifically, the material may be polyolefine contained soft material or thermoplastic elastomer containing olefine, styrene, polyester, polyurethane, vinyl chloride or polyamide.

With respect to sizes a–f shown in FIG. 1, although the invention is not restricted to the followings, a, b and c are 3 mm, d and e are 5 mm and f is 7 mm. Further, the holes 6 and the grooves 5 have a width A of 2–5 mm. A length B of each hole 6 is 3–5 mm. If the holes 6 had sizes smaller than a value in the above range, a mold for molding the cover 1 might often have a low durability. Contrarily, if the holes 6 had sizes larger than a value in the above range, the cover 1 might be broken relatively easily when a sharp object such as a fingernail pressed it.

Figure 2:
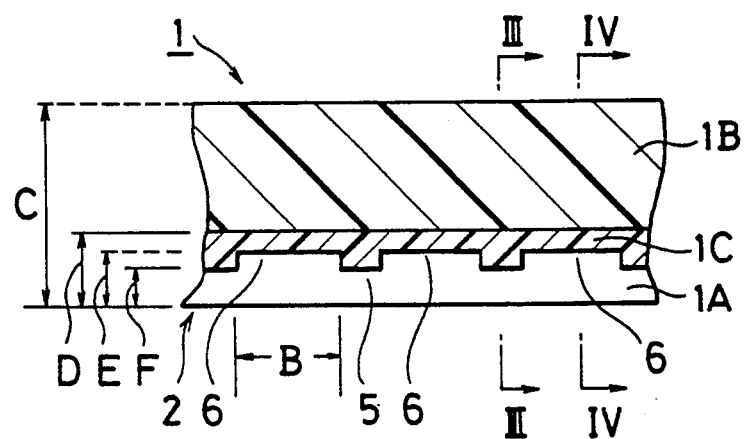
FIG. 2 is an enlarged cross section taken along line II—II in FIG. 1.

The cover 1 preferably has following thicknesses of C–F at portions shown in FIG. 2.

C: 2 to 20 mm
D: 1 to 10 mm
D–F: 0.1 to 2 mm
D–F: 0.5 to 9.5 mm

The cover 1 for accommodating the air bag of the invention can be easily and efficiently fabricated with high accuracy by the bicolor molding of the core layer 1A and the surface layer 1B.

In the cover 1 thus constructed, when the inflating pressure of the air bag becomes active, the middle portion of the cover 1 having the minimum strength starts to tear. Once the tear starts in the middle portion, this tear rapidly spreads up to the ends along the ear lines 2, 3 and 4.

Particularly, in the illustrated embodiment, the apex portion of each hole 6 is located on the center line of the groove 5, and thus the tear formed in the hole 6 rapidly spreads to the portion of groove 5 other than the hole 6. Since the groove 5 has the minimum thickness at its center line, the tear rapidly spreads along the center line of the groove 5.

In the above embodiment, the spaces between the holes 6 are reduced in the middle portion of the cover 1, so that the cover 1 may have the minimum strength at its middle portion. However, the minimum strength in the middle portion of the cover 1 may be achieved by increasing depths of the holes 6 in the middle portion.

Figure 7:
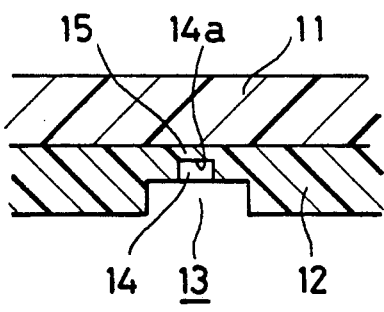
FIGS. 7 and 8 are cross sections illustrating other embodiments of grooves and holes.
Figure 8:
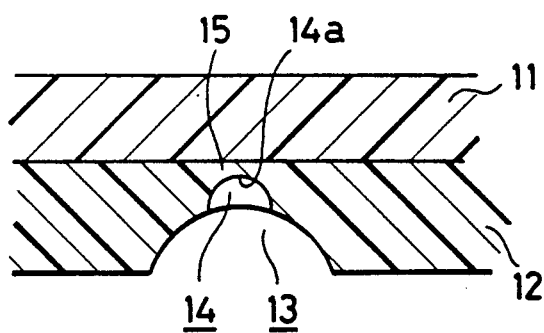

It should be noted that the invention is not restricted by the specific sectional shapes and plan or bottom shapes of the groove and holes, and, for instance, each hole may have a sectional shape such as a square (see FIG. 7) or a semicircle (FIG. 8), other than the pentagon shown in FIG. 4. Further, the groove may have a sectional shape, other than the triangle shown in FIG. 3, such as a semicircle (FIG. 8), a square (FIG. 7) or an oval.

According to the cover of the invention, as described hereinabove, there is provided the high quality cover for accommodating the air bag, in which the minimum strength portion for surely starting the tear is formed by the groove and the holes, and which can be easily and efficiently fabricated with the high molding accuracy by the multicolor molding without a defect which may be caused by the surface contraction in the molding process.

What is claimed is:

1. A cover for accommodating an air bag, comprising,
  a surface layer made from soft resin and defining an external surface of said cover; and
  a core layer made from hard resin and laminated inside the surface layer, said core layer defining an inner surface of said cover and having a groove for tearing the cover when the air bag is inflated, and a plurality of holes situated inside and along the groove to be spaced apart from each other to facilitate tearing of the cover, each hole having a bottom located in the core layer so that the holes are not directly exposed to the surface layer to thereby prevent contraction of the surface layer when cured.

2. A cover of claim 1, wherein said groove has a triangular section.

3. A cover of claim 2, wherein said holes have hexagonal shapes with apexes when viewed from an inner side of said cover, and the apexes of said hexagon are positioned on a center line which is located at deepest position in said groove.

4. A cover of claim 2, wherein said hard resin layer located between bottom portions of said groove other than bottoms of said holes and said surface layer has a thickness in a range from 0.5 mm to 9.5 mm.

5. A cover of claim 1, wherein said groove has one of semicircular and square sections.

6. A cover of claim 1, wherein said holes have pentagonal sections.

7. A cover of claim 6, wherein at a position having a maximum depth in said holes, said hard resin layer located between bottoms of said holes and said surface layer has a thickness in a rage from 0.1 mm to 2 mm.

8. A cover of claim 1, wherein said holes have one of square and semicircular sections.

9. A cover according to claim 1, wherein said holes disposed in the groove are arranged so that distances between the holes adjacent to each other change to facilitate tearing of the cover.

10. A cover according to claim 9, wherein said distance between the holes at a middle of the cover is made smaller than the distance between the holes at portions away from the middle of the cover so that tearing of the cover positively starts from the middle of the cover.

11. A cover according to claim 10, wherein a minimum length between adjacent holes in said groove extending in the lengthwise direction is 3 mm, a maximum length between adjacent holes is 7 mm and an intermediate length between the minimum and maximum lengths is 5 mm.

12. A cover according to claim 1, wherein said core and surface layers are produced by multicolor molding.

* * * * *